Jan. 4, 1938.　　　　P. F. SPERRY　　　　2,104,279
AIR DISTRIBUTING MEANS
Filed June 10, 1935　　　2 Sheets-Sheet 1

Inventor:
Philmore F. Sperry,
By Zabel, Carlson & Wells
Attorneys

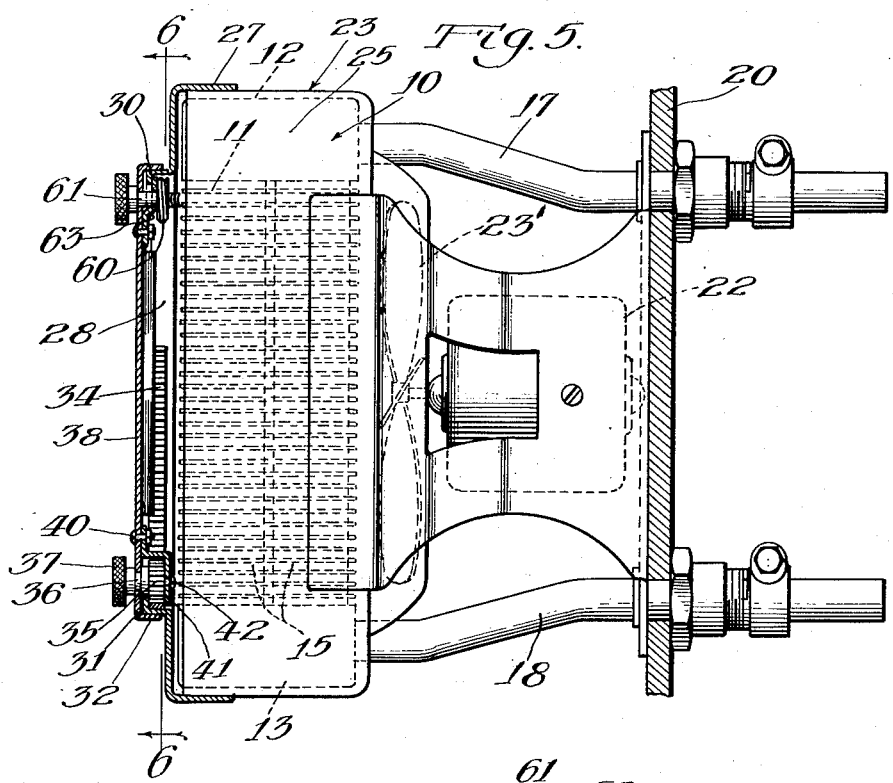

Patented Jan. 4, 1938

2,104,279

UNITED STATES PATENT OFFICE 2,104,279

AIR DISTRIBUTING MEANS

Philmore F. Sperry, Chicago, Ill., assignor, by mesne assignments, to Excel Auto Radiator Company, Chicago, Ill., a corporation of Delaware Application June 10, 1935, Serial No. 25,961

1 Claim. (Cl. 98—101)

The invention relates to air distributing means and is particularly adapted to be embodied in automobile heaters.

One form of the invention is embodied in an automobile heater which comprises a radiator core through which air is advanced by a fan. A housing encloses the radiator core and is provided with a large aperture through which the heated air passes. The flow of air is controlled by a plurality of baffles or shutters pivotally mounted on a shutter-carrying member which is rotatably journaled on a flange extending from the housing. Means comprising a rack and pinion is provided for angularly displacing the shutter-carrying member and means comprising a worm and worm gears is provided for angularly displacing the shutters around their pivotal axes, the construction being such that the heated air advanced from the heater can be directed as desired to heat the interior of the automobile in a comfortable manner.

Other advantages will become apparent as the following detailed description progresses, reference being had to the accompanying drawings, wherein—

Fig. 5 is a side elevation, partly in section, of the improved automobile heater, and Fig. 6 is a section taken on line 6—6 of Fig. 5.

Figure 1:
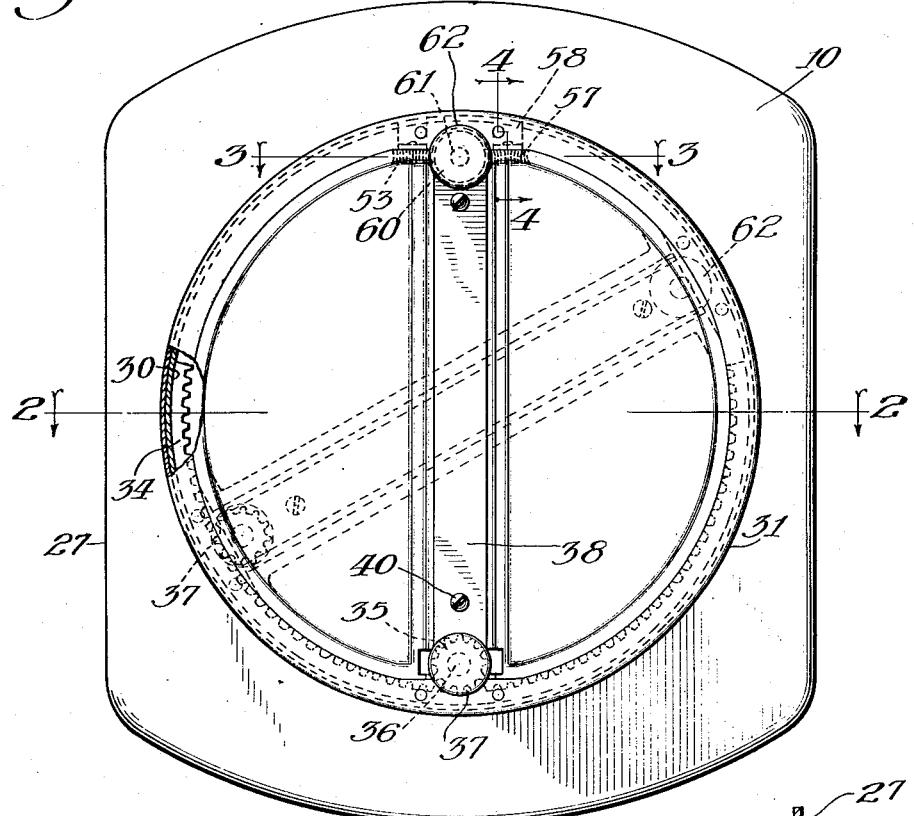
Fig. 1 is a front elevation, partly in section, of an automobile heater which embodies the invention.

Referring to the drawings wherein a preferred embodiment of the invention is shown, the reference character 10 designates generally an automobile heater which comprises a radiator core 11, the radiator core 11 comprises upper and lower manifolds or headers 12 and 13, respectively, which communicate with each other through a plurality of tubes 15. The headers 12 and 13 are connected by pipes 17 and 18, respectively, with the cooling system of an automobile, the dash-board of which is shown at 20 in Fig. 5. It will be noted that the pipes 17 and 18 pass through the dash-board 20 and support the heater 10. Interposed between the heater 10 and dash-board 20 is an electric motor 22 connected by any suitable means (not shown) to the electrical system of the automobile. The motor 22 drives a fan 23' adapted to advance air between the tubes 15 so that there will be an exchange of heat between the air and the heated fluid passing through the tubes. The heater 10 comprises a housing which is designated generally by the reference character 23. The housing 23 encloses the radiator core 11. The housing 23 comprises a housing member 25 which is closed at its front end by means comprising a housing member 27 having a relatively large central aperture 28 through which the heated air is advanced. The housing member 27 is provided with an annular flange 30 encircling the aperture 28 and rotatably journaled upon the flange 30 is a shutter-carrying member or plate 31, the shutter-carrying member 31 being formed with an annular flange 32 which rides upon the flange 30.

Disposed within the annular flange 30 is a segmental internal gear 34 with which a pinion 35 meshes. The pinion 35 is fixed to a stub shaft 36 which is provided at its outer end with a knob 37. The stub shaft 36 is rotatably journaled in a diametrically extending member 38 formed integral with the shutter-carrying member 31. It will be noted that the stub shaft 36 is enlarged at each side of the member 38 so that it can not be displaced longitudinally (Fig. 5).

Secured to the inner side of the member 38 by a screw 40 is a bent bar 41 which abuts against one side of the pinion 35. A screw 42 which passes through the bent bar 41 is screw-threaded into the shaft 36, the longitudinal axis of the screw 42 being coincident with the axis of rotation of the stub shaft 36. It will be noted that the bent bar 41 co-operates with a flange 44 formed integral with the flange 30 to hold the shutter-carrying member 31 in place upon the flange 30.

It will be readily understood that if the knob 37 is rotated manually in either direction the pinion 35 will travel along the toothed segment 34 and carry the shutter-carrying member 31 with it. Thus, if the knob 37 is rotated in a counter-clockwise direction (Fig. 1) the shutter-carrying member 31 may be displaced from the position wherein it is shown in Fig. 1 to the position wherein it is shown in dotted lines in the same figure.

Figure 3:
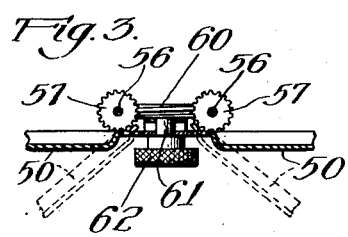
Fig. 3 is a section taken on line 3—3 of Fig. 1.
Figure 4:
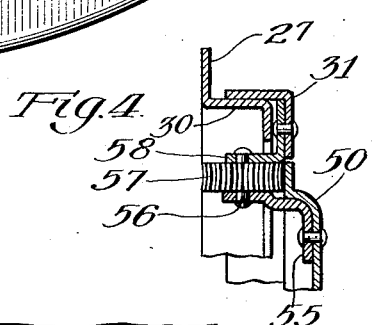
Fig. 4 is an enlarged section taken on line 4—4 of Fig. 1.
Figure 2:
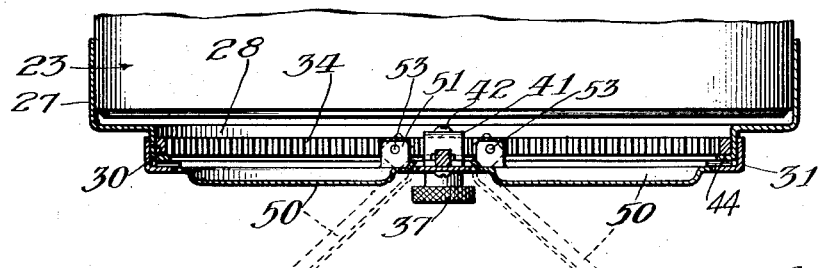
Fig. 2 is a section taken on line 2—2 of Fig. 1.

The shutter-carrying member is provided with semi-circular shutters 50 which, when they are in their closed positions as shown in full lines in Fig. 2, will prevent the effectual flow of heated air through the radiator core 11 even though the fan 23 is in operation. The shutters 50 are provided with lugs 51 which are pivoted upon lugs 52 by pins 53, the lugs 52 being formed integral with the shutter-carrying member 31. The shutters 50 have brackets 55 riveted thereto and fixed to each bracket 55 by a pin 56 is a gear 57. The pins 56 are rotatably journaled in brackets 58 which are riveted to the inner surface of the shutter-carrying member 31 (Figs. 4 and 6). The gears 57 mesh with a worm 60 fixed on the inner end of a stub shaft 61 which is provided at its outer end with a knob 62 (Fig. 3). The shaft 61 is journaled in the shutter-carrying member 31 and in a bracket 63 which is riveted to the inner side of the shutter-carrying member. The bracket 63 cooperates with the flange 44 to hold the shutter-carrying member 31 in place upon the annular flange 30 (Fig. 5).

It will be readily understood that if the knob 62 is rotated in the proper direction, the shutters 50 will be displaced angularly from the positions wherein they are shown in full lines in Figs. 2 and 3 to the positions wherein they are shown in dotted lines in the same figures. Also, if the knob is rotated in the opposite direction, the shutters may be brought into their closed positions.

Obviously, one may adjust the shutter-carrying member 31 and the shutters 50 by means of the knobs 37 and 62 to direct the flow of heated air from the heater 10 in any direction desired. It will also be understood that the shutters 50 may be adjusted to control the quantity of heated air delivered from the heater. Thus, if the shutters are nearly but not quite closed, a relatively small amount of heated air will be delivered by the heater but when the shutters 50 are in their fully opened positions, the maximum amount of heated air will be delivered by the heater.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

I claim:—

Apparatus for directing the flow of air comprising a housing member having an aperture therein, a shutter-carrying member rotatably journalled on said housing member, a gear segment carried by one of said members, a gear carried by the other of said members and meshing with said gear segment, means for rotating said gear to rotate said shutter-carrying member, a shutter movably mounted on said shutter-carrying member, means including a plurality of gears for displacing said shutter, and means forming a part of the supports for the shutter-carrying member rotating mechanism and the shutter displacing means for retaining the shutter-carrying member on the housing member.

PHILMORE F. SPERRY.